No. 872,927. PATENTED DEC. 3, 1907.
H. J. GEHR.
PROCESS OF SEPARATING GARLIC OR THE LIKE FROM GRAIN.
APPLICATION FILED MAR. 27, 1906.
Fig. I.
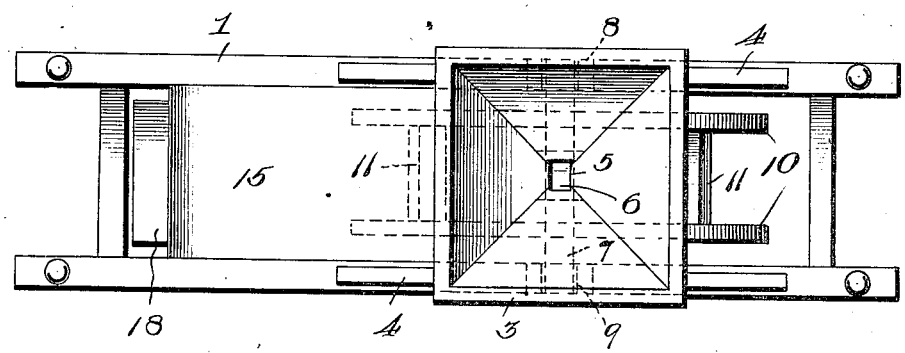
Fig. II.
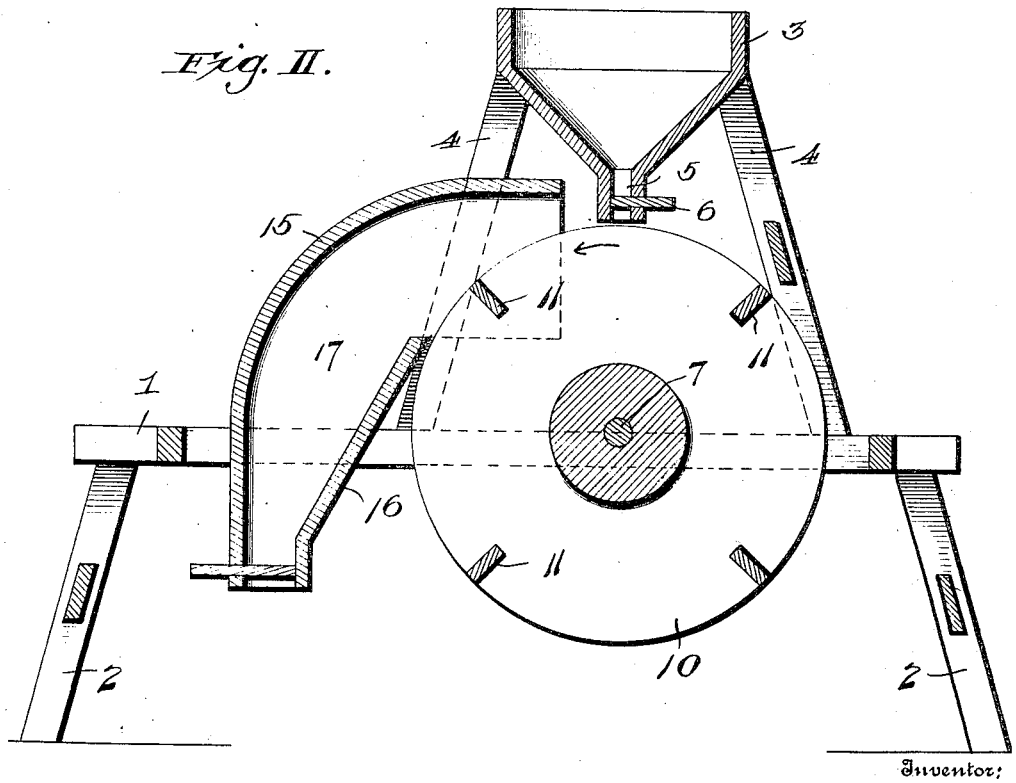
Witnesses
Inventor:
Harvey John Gehr
By Joseph F. Atkins,
Attorney.

UNITED STATES PATENT OFFICE.

HARVEY JOHN GEHR, OF WAYNESBORO, PENNSYLVANIA.

PROCESS OF SEPARATING GARLIC OR THE LIKE FROM GRAIN.

No. 872,927.  Specification of Letters Patent.  Patented Dec. 3, 1907.

Application filed March 27, 1906. Serial No. 308,244.

*To all whom it may concern:*

Be it known that I, HARVEY JOHN GEHR, of Waynesboro, in the county of Franklin, State of Pennsylvania, have invented a certain new and useful Process of Separating Garlic or the Like from Grain, of which the following is a specification.

The object of my invention is to produce an improved process for promoting the separation of garlic, or the like, from grain, particularly wheat. The presence in wheat, for example, of garlic in its natural state, is noxious for the reason that the garlic cannot be, in its natural state, separated from the wheat, and if ground up with the wheat, it fouls and injures the flour or other wheat product.

My invention consists, in its broadest aspect, in the dehydration of the garlic contained in a mixture of grain and garlic by artificial means employed upon the mixture in a loose and non-compacted state, said means being preferably the application of crushing force, preferably of impact, to the component elements of the mixture under the conditions specified, the force applied being sufficient to crush the garlic but not the grain.

The utility of the invention depends chiefly upon the nature of the garlic itself, which conventionally may be denominated a grain or berry whose condition, particularly just after harvest, is plump and full of moisture. Now wheat is employed either whole, as for example in seed wheat, or in the form of a manufactured article produced as by grinding or pulverization.

Firstly, then in respect to seed wheat, the vitality of the germ of the garlic grain or berry depends upon the presence in it of moisture, which, being volatile, disappears when the garlic is well crushed. Consequently, garlic crushed is equivalent to garlic degerminated. It will not sprout and its separation from seed wheat, in the ground, is effectuated in the germinating process of nature.

Secondly, the most extensive use of wheat is in the manufacture of flour in which the presence of garlic is injurious, not so much by reason, as will hereinafter appear, of its offensive odor as of the moisture it contains. The presence of moisture from such source is objectionable in the manufacture of flour for two distinct causes, both of which causes may be eliminated by the dissipation of the moisture or the dehydration of the garlic at the proper time, that is to say, at any time so long as the grains of the wheat remain intact and under conditions which preclude its contamination from said moisture. The causes referred to are these, namely, that damage, either of a temporary or permanent nature, results, in manufacture, to flour-mill rolls, if moisture be present in the grist when fed to the rolls, and also that the odor of garlic is ineradicable from flour which has once been impregnated by the moisture of the garlic berry. In respect to the cause first named, if commingled wheat and whole garlic be fed to a flour-mill, the moisture of the garlic is pressed out in passing through the mill rolls, and at once forms with the flour a stiff paste which adheres to the small corrugations of the rolls. The adherence of the paste to the rolls gums them up, destroying their usefulness as such, and by reason of the consequent enlargement of the diameter of the rolls, causes their bearings to heat, thereby necessitating the stopping of the machine and the washing of the rolls as with water and a brush. This ground of objection to the presence of garlic in grain and the cause thereof as set forth, are well understood in the milling art; but it is the subsistence of the second cause along with the first that lends difficulty to the problem of separating garlic from grain without injury to the latter, as will appear from what immediately follows.

Such is the volatile nature of the moisture contained in whole garlic that the crushing of a garlic berry will if sufficient time to dry after crushing be allowed, suffice to dehydrate it, leaving only a dry chaff-like husk, which betrays but a faint odor of garlic. Dehydrated garlic, as has been specified, is degerminated and, therefore, unobjectionable in seed wheat, and in grist wheat it is practically innocuous, for the reason that it may be separated from the wheat by any suitable process for removing chaff from grain, or even if ground with the grain, such is the difference between natural and dehydrated garlic, it may be drawn off in tailings without spoiling the flour or degrading it. Hence it appears that a practicable process of dehydrating the garlic contained in a mixture of grain and garlic is a complete process for the practical elimination of the garlic in so far as it prepares, without further treatment, the grain for any use to which it may be put, despite the fact that it promotes, as an ultimate consideration, separation of the garlic from the grain, and notwithstanding that, the actual separation finally accomplished may be effected, as with seed wheat, after it is in the earth, or as with grist wheat, after it has passed through the mill.

From the foregoing statement, it appears that dehydrated garlic commingled with untainted grain resulting from ordinary methods of agriculture is innocuous, and that crushing of the garlic will suffice to dehydrate it. The difficulty to be overcome in dehydrating the garlic contained in a mass of grain is to do it without injury to the grain if used for seed, or without tainting it if used for manufacture, the fact being recognized that, if in the process of dehydration for the purposes of manufacture any portion of the moisture of the garlic penetrate the outer, comparatively impervious shell of a grain of wheat, it will ineradicably taint and contaminate the mass to the extent at least of that grain, and more than that to the extent to which that grain, when ground into flour, may, as a conservative source, diffuse an offensive odor throughout other flour with which it may be commingled.

Hitherto, the only available method of separating garlic from grain is a natural process which proceeds upon the principle of dehydration and under conditions which prevent the contamination or tainting of the grain in the course of such dehydration. I refer to the effect of severe freezing upon garlic which may suffice to burst the garlic berry, and thereby to effectuate its ultimate elimination through its dehydration. This process, however, is slow, and, therefore, expensive; and at best, it is uncertain. Besides it exacts a condition which is dependent upon seasons, and is impossible in many latitudes where grain, particularly wheat, is produced. It has long been proposed in the art to crush the garlic berry by passing the commingled grain and garlic between rollers; but in practice that method has presented the serious difficulty that if sufficient pressure be employed to reliably crush the garlic, it will also crush a portion of the wheat and expose it to the contamination of the moisture liberated from the garlic in the crushing process, which contamination, as has already been set forth, is ineradicable. Moreover, in passing the wheat and garlic between rollers, the mass is more or less compacted to an extent which may permit the moisture of the garlic berry, wherever it is liberated, to cement together a number of grains, and thereby, preventing to a greater or less extent dehydration, tending to conserve the offensive odor of the garlic and to contaminate the grain.

My invention, for reasons already explained, has to do only with that step in the operation of separation which effects the crushing of the garlic without reference to the mode of treatment of the material which may precede or follow the step to which my invention relates.

In effecting the crushing of the garlic, I do it, for reasons previously specified, under conditions which will either altogether exclude or at least minimize the contamination of the grain by the moisture exuded from the garlic in the crushing process. The conditions referred to are, that the crushing force employed shall suffice to crush the garlic but not the grain, and that the commingled grain and garlic shall be in a loose and non-compacted state. The method of crushing the garlic of commingled grain and garlic which appears to best satisfy the conditions specified is that in which the force of impact is employed to operate upon the segregated particles of the mass to be treated or separated. The crushing obtained through the application of the force of impact as contradistinguished from other means, such as squeezing, or by coöperation of revolving rollers, is preferable in practice for a variety of reasons, of which it is unnecessary to mention all. Suffice it in that connection to say that the crushing force of impact is readily susceptible of regulation and change of degree. Moreover, it avoids contamination of the grain by the moisture exuded from the crushed garlic for the reason that the crushing takes place not only while the mixture of grain and garlic is in a loose and non-compacted state, but that it takes place in the very air itself whereby the volatilization or evaporation moisture of the garlic is favored and promoted to the extent of certainly preventing the grain from afterwards uniting with such moisture in cakes, the caking of the grain with such moisture being one of the sources of contamination of flour made from a mixture of grain and garlic passed between crushing rolls.

In the accompanying drawing, which constitutes a part of this specification, I illustrate, in the simplest form of embodiment, apparatus for carrying my process into effect, observing in that connection that the apparatus for the purpose specified is susceptible of wide variation though of indefinite extent.

In the accompanying drawing, Figure I is a top plan view of one form of apparatus for the practice of my process or method. Fig. II is a longitudinal central vertical section of the subject matter of Fig. I.

Referring to the numerals on the drawing, 1 indicates an oblong rectangular frame, which may be secured upon a firm and unyielding support, diagrammatically but inadequately indicated in Fig. II by legs 2.

Recognizing that the force of impact may be derived from impingement of the mass to be separated against a sufficiently hard and unyielding surface through relative movement of a body provided with such surface and the mass to be treated, I have selected, as a means of explication of the principle of my invention, a representation of apparatus in which a body having a surface of requisite hardness is caused to advance and make impact against the segregated particles of the commingled mass to be separated, to wit, against the particles of grain and of garlic. Nevertheless, I desire it to be distinctly understood that I rely upon the relativity of movement of the mass and of the impacting surface for the accomplishment of the object of my invention, and, therefore, contemplate as practicable, in the carrying of my process into effect, the production of impact by driving the mass to be separated against a stationary, or if preferred, movable impact surface, instead of the driving of the impact surface against the mass to be separated, which is the method of operation governing the form of apparatus shown in the drawing. With this explanation as a proviso, reference is again made to the numerals on the drawing, wherein is illustrated a hopper 3 supported upon the frame 1 as by legs 4. The hopper is provided with a discharge chute 5, provided with a gate or slide 6 for regulating the out-flow from the hopper through the chute 5.

7 indicates a shaft mounted in suitable bearings 8 and 9 in opposite sides of the frame 1. The shaft is designed to be driven by any suitable means at a high rate of speed, and carries upon the side pieces of the frame 1 wheels or disks 10, between which is secured an impact-member or a series of impact-members 11, said members preferably being radially disposed. The member or each member of the series, if there be more than one member 11, passes in operative and preferably in close proximity to the chute 5, so that material discharged in a thin fall or veil from the chute 5 will derive impact, in respect to all of its constituent particles, from the motion of the member or members 11 as it or they are forcibly driven against it through rotation of the shaft 7. It is the office of gate 6 to regulate the quantity of material discharged through the chute 5 between the wheels 10, and in the path of movement of the member or members 11.

In its descent from the chute 5, the mass of material to be separated derives impact from the motion of the member or members 11, and upon that impact ensues the crushing or flattening out of the garlic, which it is the object and end of my present invention to effect. I may mention, however, that in practice the stream or veil of commingled grain and garlic from the chute 5 is necessarily deflected from its vertical direction of movement by impact against it of the member 11 or members 11 successively, the deflection being in a direction substantially at right angles. To provide for the reception of the material and to prevent its waste by dissipation, I provide, in operative contiguity to the wheels 10, a deflector 15 and apron 16, which, with cheek-pieces 17 uniting them, constitute a hood into which the commingled grain and garlic is driven by the force of impact, to which, in the manner specified, it is subjected. A gate or slide 18 is provided in the end of the hood for control of the outlet therefrom, as desired.

What I claim is:

1. The process of promoting the separation of the garlic contained in a mixture of grain and garlic by garlic crushing means employed upon the mixture while in a loose and non-compacted state.

2. The process herein described of promoting the separation of garlic from grain, which consists in subjecting the commingled mass to be separated to impact sufficient to crush the garlic but not the grain, and thereby crushing the garlic, substantially as and for the purpose specified.

3. The process of promoting the separation of garlic from grain, which consists in subjecting the elements of a falling commingled mass of garlic and grain to impact derived from a moving body, said impact being sufficient to crush the garlic but not the grain, and thereby crushing the garlic, substantially as and for the purpose specified.

4. The process of promoting the separation of garlic from grain, which consists in subjecting the elements, separately, of a commingled mass of garlic and grain to a force, sufficient to crush the garlic but not the grain, applied to one side only of said elements.

In testimony whereof I have hereunto signed my name in the presence of two subscribing witnesses.

HARVEY JOHN GEHR.

Witnesses:
SIMON WIENER,
G. E. CRAEL.